United States Patent
Khafagy et al.

(10) Patent No.: US 9,821,799 B2
(45) Date of Patent: Nov. 21, 2017

(54) VEHICLE PUMP CONDITION RESPONSE METHOD AND ASSEMBLY

(71) Applicant: FORD GLOBAL TECHNOLOGIES, LLC, Dearborn, MI (US)

(72) Inventors: Hafiz Shafeek Khafagy, Dearborn, MI (US); Brandon David Lint, Whitmore Lake, MI (US); Tim John Kropf, Westland, MI (US); William Rey Patterson, Jr., Farmington Hills, MI (US); Edward Katynski, Northville, MI (US); Richard Reynolds Hathaway, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/046,756

(22) Filed: Feb. 18, 2016

(65) Prior Publication Data
US 2017/0240166 A1 Aug. 24, 2017

(51) Int. Cl.
| | |
|---|---|
| *B60L 9/00* | (2006.01) |
| *B60W 20/50* | (2016.01) |
| *B60W 30/18* | (2012.01) |
| *F02D 41/04* | (2006.01) |
| *F02D 41/06* | (2006.01) |
| *F02D 41/08* | (2006.01) |

(52) U.S. Cl.
CPC ...... *B60W 20/50* (2013.01); *B60W 30/18018* (2013.01); *F02D 41/042* (2013.01); *F02D 41/065* (2013.01); *F02D 41/08* (2013.01)

(58) Field of Classification Search
USPC .......................................................... 701/22
See application file for complete search history.

(56) References Cited

U.S. PATENT DOCUMENTS

| | | | | |
|---|---|---|---|---|
| 6,730,000 | B1* | 5/2004 | Leising | B60W 10/06 477/110 |
| 8,068,966 | B2 | 11/2011 | Wu et al. | |
| 8,219,291 | B2 | 7/2012 | Yabes et al. | |
| 8,608,620 | B2 | 12/2013 | Kim et al. | |
| 8,616,323 | B1* | 12/2013 | Gurin | B60K 25/10 180/165 |
| 8,892,339 | B2* | 11/2014 | Ma | F02D 29/02 701/113 |
| 9,046,047 | B2 | 6/2015 | Sangameswaran et al. | |
| 2004/0144107 | A1* | 7/2004 | Breton | B60H 1/00778 62/129 |

(Continued)

FOREIGN PATENT DOCUMENTS

DE 102015103270 9/2015

OTHER PUBLICATIONS

Cord Concentrates on Control Strategies for Low-Cost Start-Stop System for Fusion, Jul. 19, 2012, Retrieved from: http://www.greencarcongress.om/2012/07/ford-20120719.html.

*Primary Examiner* — Tyler Paige
(74) *Attorney, Agent, or Firm* — Carlson, Gaskey & Olds, P.C.

(57) ABSTRACT

An exemplary pump condition response method includes, in response to a pump condition, operating an engine to discontinue or prevent a first stop-start cycle during a drive cycle. The method permitting a second stop-start cycle during the drive cycle.

20 Claims, 3 Drawing Sheets

(56) References Cited

U.S. PATENT DOCUMENTS

| | | | |
|---|---|---|---|
| 2004/0153236 A1* | 8/2004 | Itoh | B60K 6/485 701/113 |
| 2006/0137643 A1* | 6/2006 | Thompson | F02N 11/0803 123/179.4 |
| 2010/0217470 A1* | 8/2010 | Aldrich, III | F04B 51/00 701/31.4 |
| 2011/0077830 A1* | 3/2011 | Lochocki, Jr. | B60W 10/02 701/68 |
| 2011/0166727 A1* | 7/2011 | Light | B60K 6/445 701/22 |
| 2014/0309910 A1* | 10/2014 | Hesketh | F02N 11/0822 701/112 |
| 2015/0159576 A1 | 6/2015 | Surnilla et al. | |
| 2015/0219056 A1* | 8/2015 | Boesch | F02N 11/003 701/112 |
| 2016/0281630 A1* | 9/2016 | Rockwell | F02M 37/08 |

\* cited by examiner

VEHICLE PUMP CONDITION RESPONSE METHOD AND ASSEMBLY

TECHNICAL FIELD

This disclosure relates generally to how a vehicle responds to conditions of a pump, such as an electronic transmission pump (epump). The vehicle can discontinue or prevent a stop-start cycle in response to some conditions.

BACKGROUND

Generally, a drive-cycle for a vehicle begins at key-on or when the vehicle otherwise started. The drive cycle then ends at key-off. Stop-start vehicles can incorporate a stop-start system that selectively shuts down an engine during portions of the drive cycle. Shutting down the engine can conserve fuel and reduce emissions. For example, a stop-start system can shut down the engine when the stop-start vehicle is stopped instead of allowing the engine to idle. The engine is then restarted when a driver depresses the accelerator pedal or when the engine is required to operate to power accessories of the stop-start vehicle.

Some electrified vehicles shut down and restart an engine during portions of a drive cycle. The electrified vehicles may use electric machines powered by a traction battery to generate torque that rotates vehicle drive wheels when the engine is shut down. The engine is restarted when additional torque is required, or the engine is required to operate to power accessories of the electrified vehicle.

When an engine of vehicle is stopped during a drive cycle, an electronic pump can be used to maintain pressures of a fluid within the engine and other portions of the vehicle. Some vehicles monitor a condition of the electronic pump, but react to the conditions in a way that can dissatisfy a driver of the vehicle.

SUMMARY

A pump condition response method according to an exemplary aspect of the present disclosure includes, among other things, in response to a pump condition, operating an engine to discontinue or prevent a first stop-start cycle during a drive cycle, and then permitting a second stop-start cycle during the drive cycle.

In another example of the foregoing method, the pump condition is a recoverable fault.

In another example of any of the foregoing methods, the pump condition is a first pump condition, and the method further includes, in response to a second pump condition, operating the engine for a remainder of the drive cycle to prevent any stop-start cycle during the drive cycle In another example of any of the foregoing methods, the second pump condition is non-recoverable fault.

In another example of any of the foregoing methods, the first stop-start cycle and the second stop-start cycle are within the same drive cycle.

In another example of any of the foregoing methods, the operating comprises idling.

In another example of any of the foregoing methods, the pump condition is a recoverable fault and is received when the pump is commanded on and the engine is commanded off. The method further comprises starting the engine and then receiving an additional pump condition later in the drive cycle. The method permits the second stop-start cycle if the additional pump condition indicates that the pump has recovered from the recoverable fault In another example of any of the foregoing methods, the pump condition is first pump condition, and the method further includes, in response to a second pump condition, preventing any stop-start cycle during a remainder of the drive cycle.

An electrified vehicle assembly according to another exemplary aspect of the present disclosure includes, among other things, a pump, an engine, and a vehicle controller. The vehicle controller is configured to discontinue or prevent a first stop-start cycle by commanding the engine on in response to a pump condition received during a drive cycle. The vehicle controller is further configured to permit a second stop-start cycle of the engine later in the drive cycle if the pump condition is a recoverable fault.

In a further non-limiting embodiment of the foregoing assembly, the pump condition is a recoverable fault.

In a further non-limiting embodiment of any of the foregoing assemblies, the pump condition is a first pump condition, and the vehicle controller is further configured to command the engine to operate for a remainder of the drive cycle in response to a second pump condition.

In a further non-limiting embodiment of the foregoing assembly, the second pump condition is a recoverable fault.

In a further non-limiting embodiment of any of the foregoing assemblies, the first stop-start cycle and the second stop-start cycle are within the same drive cycle.

In a further non-limiting embodiment of any of the foregoing assemblies, the pump condition is the recoverable fault and is received when the pump is commanded on and the engine is commanded off. The controller is further configured to command the engine on and to permit the second stop-start cycle if an additional pump condition received later in the drive cycle indicates that the pump has recovered from the recoverable fault.

In a further non-limiting embodiment of any of the foregoing assemblies, the pump condition is first pump condition, and further comprising, in response to a second pump condition, preventing any stop-start cycle during a remainder of the drive cycle.

In a further non-limiting embodiment of any of the foregoing assemblies, the vehicle controller comprises a powertrain control module.

In a further non-limiting embodiment of any of the foregoing assemblies, the engine, the pump, and the vehicle controller are portions of a stop-start vehicle.

In a further non-limiting embodiment of any of the foregoing assemblies, the engine, the pump, and the vehicle controller are portions of an electrified vehicle.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates to monitoring and reacting to conditions of a pump within a vehicle. Some pump conditions reflect a potentially recoverable fault associated with the pump. In response to such a pump condition, the vehicle may discontinue or prevent a stop-start cycle within a drive cycle, but permit a subsequent stop-start cycle later in the drive cycle.

Figure 1:
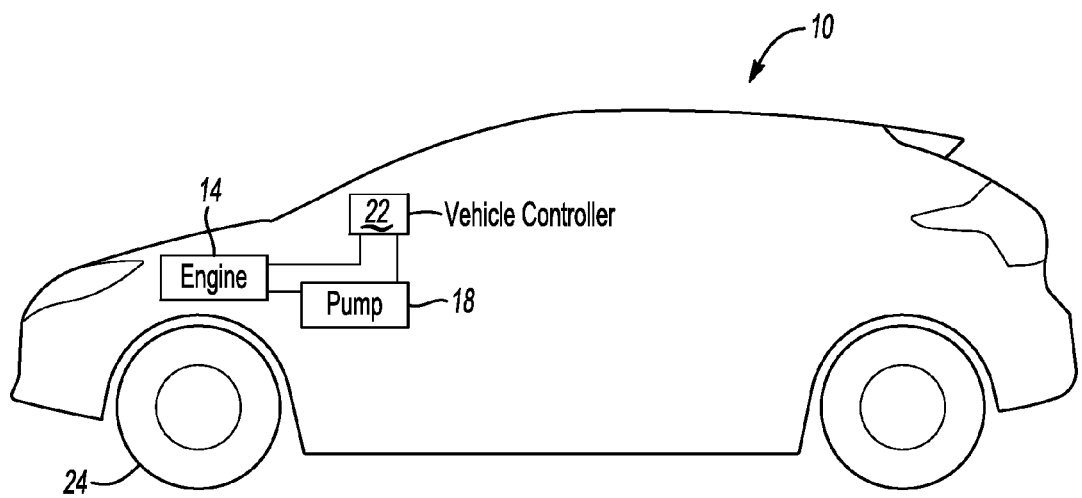
FIG. 1 shows a side view of an example stop-start vehicle.

Referring to FIG. 1, an example vehicle 10 includes an engine 14, a pump 18, and a vehicle controller 22. The example vehicle 10 is a stop-start vehicle that incorporates stop-start system. At least the engine 14, pump 18, and controller 22 provide portions of the stop-start system.

The engine 14 can be employed as a drive source for wheels 24 of the vehicle 10. The vehicle 10 can be a rear wheel drive, front wheel drive, or all-wheel drive vehicle.

In one embodiment, the engine 14 is an internal combustion engine. Although not shown, the vehicle 10 could include additional propulsion devices capable of driving wheels of the vehicle 10, such as an electric machine (i.e., a motor, generator, or combined motor generator), within hybrid vehicle embodiments. That is the vehicle 10 could be an electrified vehicle, or another type of vehicle incorporating a stop-start system. In one specific example, the vehicle 10 is a micro-hybrid vehicle. Other examples can include mild-hybrids and rolling stop-start vehicles.

The example pump 18 is an electric transmission pump (epump) that maintains pressure of a fluid within the vehicle 10. The fluid can circulate through portions of the engine 14 and through other areas of the vehicle 10, such as through a transmission associated with the engine 14. The pump 18 can circulate the fluid in some examples in addition to maintaining fluid pressure.

The pump 18 is typically used to maintain pressure on the fluid and circulate the fluid when the engine 14 is not able to do so, such as when the engine 14 is commanded off during a stop-start cycle.

The controller 22 is operably linked to the engine 14 and the pump 18. The controller 22 can cause the engine 14 to stop operating or can cause the engine 14 to start operating.

While schematically illustrated as a single controller, the controller 22 may be part of a larger control system within the vehicle 10 and may be controlled by various other controllers throughout the vehicle 10, such as a vehicle system controller (VSC) that includes a powertrain control unit, a transmission control unit, an engine control unit, etc. It should therefore be understood that the controller 22 can be referred to as a controller that controls, such as by a plurality of interrelated algorithms, various functions of the vehicle 10. Functions controlled by the controller 22 include stopping and starting the engine 14, and stopping and starting the pump 18. In one embodiment, the various controllers that make up the VSC may communicate with each other using a common bus protocol (e.g., CAN).

In an exemplary start-stop cycle of the vehicle 10, the engine 14 is automatically shut down during times when the vehicle 10 is not moving or does not require substantial torque from the engine 14. The engine 14 is then restarted as necessary when the vehicle 10 begins to move or is required to operate to drive accessories of the engine 14. The vehicle 10 including the stop-start functionality can shut down and restart the engine 14 to reduce the amount of time the engine 14 spends idling, which can desirably reduce fuel consumption and emissions. Automatically shutting down the engine 14 can be advantageous for vehicles that spend significant amounts of time waiting at traffic lights or frequently operate in stop-and-go traffic.

In some examples, the vehicle 10 may enter an auto-stop mode (i.e., the engine 14 is auto stopped when certain vehicle propulsion conditions are met), such as when the drive has applied the brakes and the speed of the vehicle 10 is below a predetermined speed threshold. Once the driver indicates a request for vehicle propulsion (e.g., by releasing a brake pedal), the controller 22 automatically commands a restart of the engine 14.

When the engine 14 is shut down, the pump 18 operates to maintain pressure and circulate fluid. The pump 18 is typically commanded on just before the engine 14 is shut down at the start of a stop-start cycle. Starting the pump 18 just prior to the stop-start cycle ensures that fluid pressure and circulation is sufficient during the stop-start cycle.

In the past, even if the controller 22 would detect an undesirable condition of the pump 18, the controller 22 would still permit the engine 14 to shut down and begin the stop-start cycle. The undesirable condition associated with the pump 18 would then result in insufficient fluid pressure, fluid circulation, or both. Insufficient fluid pressure or circulation can cause undesirable driveline clunk when the engine 14 is restarted at the conclusion of the stop-start cycle. The exemplary embodiment, among other things, addresses these issues by preventing a stop-start cycle of the engine 14 if certain conditions are detected from the pump 18.

Figure 2:
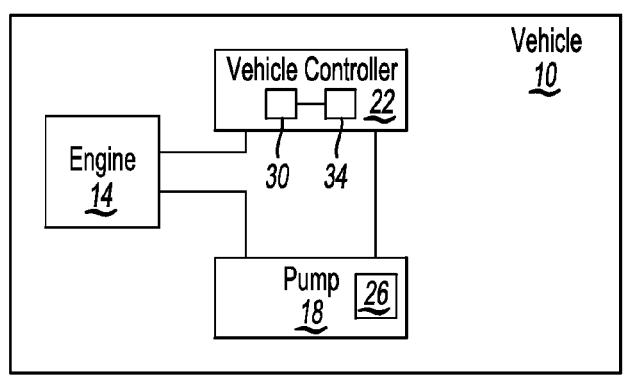
FIG. 2 shows a highly schematic view of the stop-start vehicle of FIG. 1.

Referring now to FIG. 2 with continued reference to FIG. 1, the example pump 18 is an auxiliary electric transmission fluid pump. The pump 18 can be referred to as an epump. The pump 18 includes a motor 26 that is powered to drive the pump 18. When powered, the pump 18 can maintain fluid pressure and circulate fluid within the engine 14, a transmission associated with the engine 14, or both.

The example vehicle controller 22 includes a processor 30 and a memory portion 34. The processor 30 can be programmed to execute a program stored in the memory portion 34. The program can be stored in the memory portion 34 as software code. The program stored in the memory portion 34 can include one or more additional or separate programs, each of which includes an ordered listing of executable instructions for implementing logical functions associated with, for example, controlling stop-start cycles of the engine 14 in response to conditions received from the pump 18.

Figure 3:
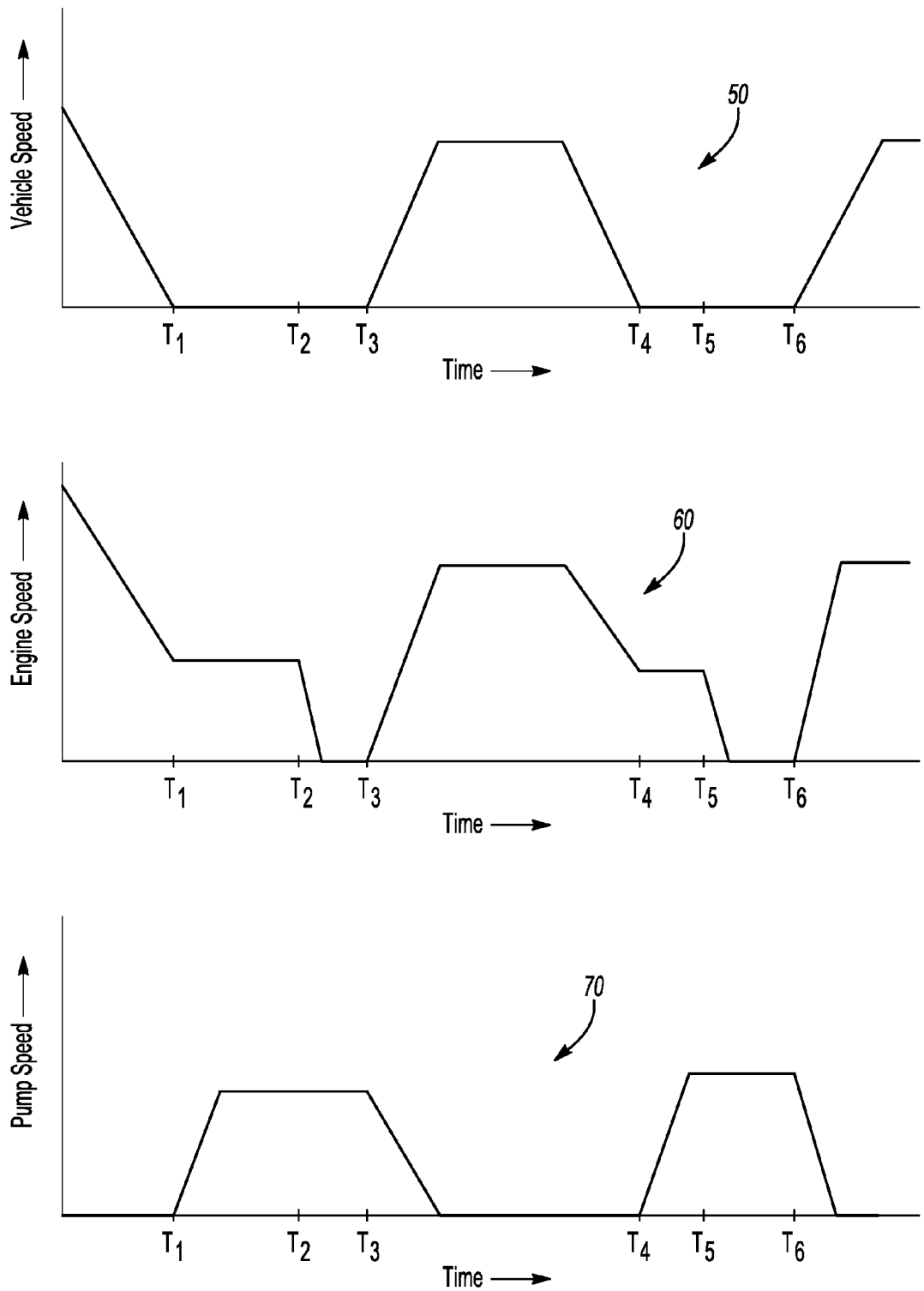
FIG. 3 graphically shows speeds of the vehicle, engine, and pump during a selected portion of a drive cycle for the vehicle of FIG. 1.

Referring now to FIG. 3 with continuing reference to FIGS. 1 and 2, a graph 50 shows speeds of the vehicle 10 during a selected portion a drive cycle for the vehicle 10. Further, a graph 60 shows corresponding speeds of the engine 14, and a graph 70 shows corresponding speeds of the pump 18 during the selected portion of the drive cycle.

Generally, the drive cycle begins when a user powers on the vehicle 10 from a shutdown condition. The drive cycle continues until the user shuts down the vehicle 10 when, for example, the user has reached a desired destination. In some examples, the vehicle 10 is keyed on to start a drive cycle and keyed off to conclude a drive cycle. For purposes of this disclosure, a drive cycle should not be interpreted as referring to the general changes in operating states of the vehicle 10 as the vehicle 10 is driven. For example, when the vehicle 10 shuts down the engine 14 to begin a stop-start cycle, this is not a conclusion of a drive cycle unless the vehicle 10 is keyed off.

The selected portion of the drive cycle includes two separate stop-start cycles. The first stop-start cycle begins at time $T_2$ and ends at time $T_3$. The second stop-start cycle begins at time $T_5$ and ends at time $T_6$. The engine 14 is commanded off and is not operating during the two stop-start cycles. The engine 14 is commanded off at the time $T_2$ to begin the first stop-start cycle and commanded on at time $T_3$ to end the first stop-start cycle. The engine 14 is commanded off at the time $T_5$ to begin the second stop-start cycle and commanded on at time $T_6$ to end the second stop-start cycle.

The pump 18 is commanded on and starts increasing in speed at the time $T_1$ to support the first stop-start cycle. The pump 18 is then commanded off at the time $T_3$. The pump 18 is commanded on and starts increasing in speed at the time $T_4$ to support the second stop-start cycle. The pump 18 is then commanded off at the time $T_6$. The times from $T_1$ to $T_2$ and from $T_4$ to $T_5$ can be considered prestaging times for the respective stop-start cycles. In some examples, the pump 18 is commanded on 3 milliseconds prior to the start of a stop-start cycles.

The vehicle controller 22 continually monitors the pump 18 throughout the drive cycle. The pump 18 can convey specific pump conditions to the controller 22 via electronic communications. In some examples, the pump 18 may send a signal to the controller 22. The signal changes to represent a particular pump condition.

The signal sent to the controller 22 from the pump 18 can be a pulse width modulated signal. In such an example, the pump 18 may vary a duty cycle of the pulse with modulated signal to represent a particular pump condition.

Figure 4:
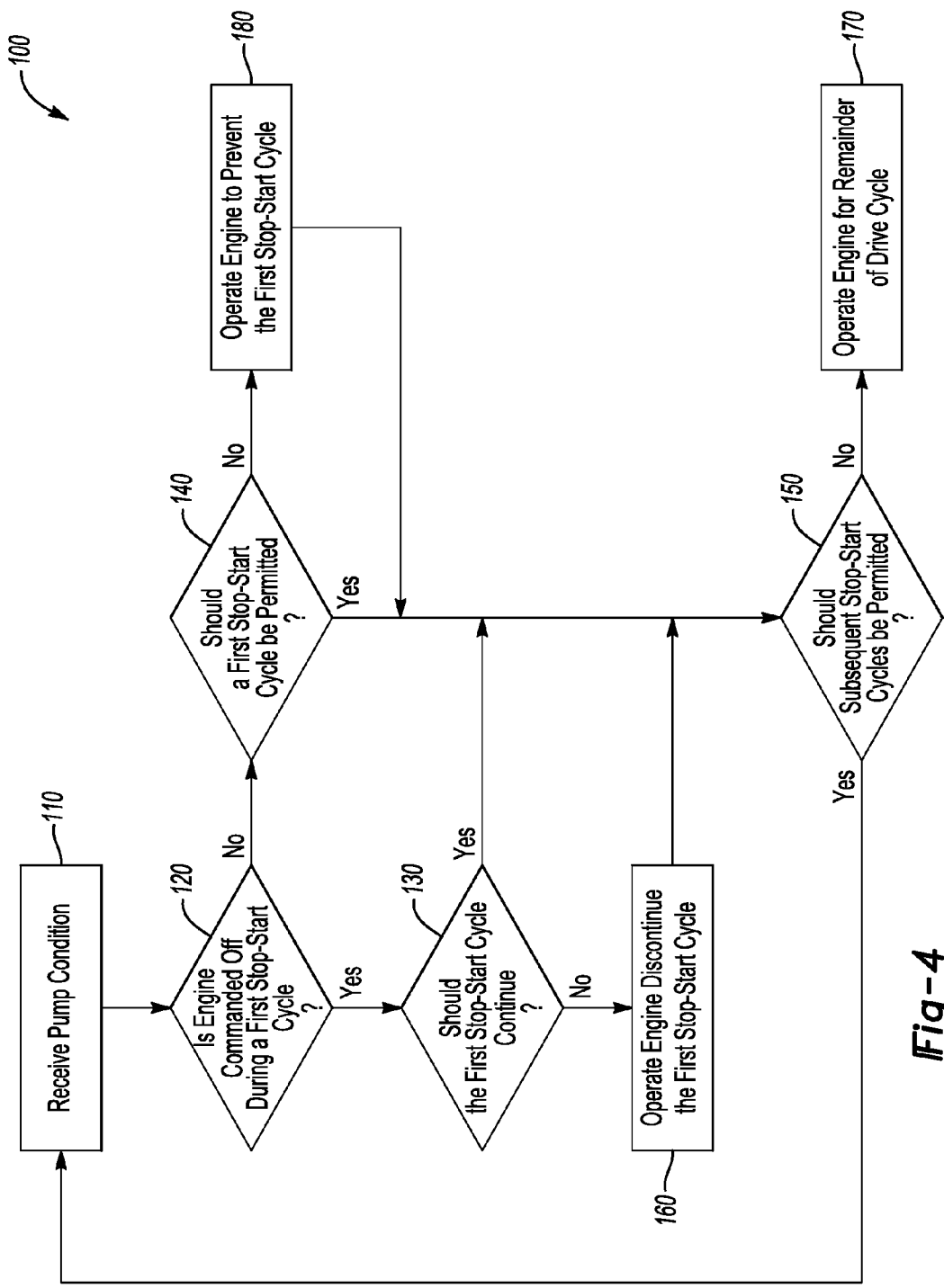
FIG. 4 shows an exemplary pump response method utilized by the vehicle of FIG. 1.

Referring now to FIG. 4 with continuing reference to FIG. 2, an exemplary pump response method 100 begin at a step 110 where a pump condition is received at the controller 22. The method 100 then moves to step 120, which assesses whether the engine 14 is commanded off during a first stop-start cycle. The engine 14 is commanded off during a first stop-start cycle, in this example, from time $T_2$ to $T_3$. If the assessment determines that the engine 14 is off, the method 100 moves to a step 130. If the engine 14 is not commanded off, and thus operating, the method moves to a step 140.

At the step 130, the method 100 calculates whether the first stop-start cycle should continue. If yes, the method 100 continues to a step 150. If no, the method 100 continues to a step 160, which commands on the engine 14 so that the engine 14 operates and discontinues the first stop-start cycle. Assessing whether the first start-stop cycle should continue depends, at least in part, on the pump condition received at the step 110. Some pump conditions necessitate discontinuing a stop-start cycle, while others can permit the stop-start cycle to continue.

At the step 150, the method 100 calculates whether subsequent stop-start cycles should be permitted. If yes, the method 100 returns to the step 110. If no, the method 100 moves to a step 170, which causes the engine 14 to operate for a remainder of the drive cycle. Assessing whether the subsequent start-stop cycles should be permitted depends, at least in part, on the pump condition received at the step 110. Some pump conditions necessitate preventing stop-start cycles for a remainder of the drive cycle, while others, such as those indicating recoverable pump faults, can permit subsequent stop-start cycles to permit recovery from those faults.

Returning to the step 140, the engine 14 is commanded on and operating. At the step 140, the method 100 calculates whether a first stop-start cycle should be permitted. If yes, the method 100 moves to the step 150. If no, the method 100 progresses to a step 180, which continues operating the engine 14 to prevent the first stop-start cycle. Assessing whether the first start-stop cycle should be permitted depends, at least in part, on the pump condition received at the step 110. Some pump conditions necessitate preventing any stop-start cycles, while others, such as those indicating recoverable pump faults, can permit the first stop-start cycle and then prevent subsequent stop-start cycles if the pump has not recovered.

Pump conditions received by the controller 22 can represent a variety of conditions related to the pump 18 and operation of the pump 18. Some pump conditions indicate that the pump 18 is functioning properly. Others can represent pump faults that are potentially recoverable. That is, the pump 18 may self-correct during operation to recover from the pump fault. Other pump faults are not recoverable. Several example pump conditions are described below.

In one example, the controller 22 receives a pump condition indicating that the pump 18 has an undercurrent/load, but the speed of the motor 26 correct. This pump condition can mean that a current at the pump 18 is less than a threshold percent of a normal current (e.g., 10% of normal operating range of current at actual and normal speed, speed +/− 10%). If this pump condition is received outside of a stop-start cycle of the engine 14, the controller 22 may prevent an upcoming stop-start cycle of the engine 14 by continuing to keep the engine 14 operating. Since the engine 14 continues to operate, driveline clunk, or other undesirable factors due to restarting the engine 14 are avoided. If this pump condition is detected when the engine 14 is shut down during a stop-start cycle, the controller 22 may permit the stop-start cycle to continue and the stop-start cycle is not interrupted. This pump condition is considered a recoverable fault. That is, if the condition is detected after the engine 14 is shut down, the condition may self-correct during a subsequent start-stop cycle later in the drive cycle where repriming is most likely to occur. After the condition is self-corrected, the controller 22 would no longer detect the condition.

In another example, the controller 22 receives a pump condition indicating that the pump 18 has an overcurrent/load, but the speed of the motor 26 is correct. This pump condition can mean that a current at the pump 18 is greater than a threshold percent of a normal current (e.g., 10% of normal operating range of current at actual and normal speed, speed +/− 10%). In response to this pump condition, the controller 22 may shut down the motor 26 after a threshold delay, say ten seconds. Shutting down the motor 26 can protect the motor 26. In response to this pump condition, the controller 22 can further prevent any upcoming stop-start cycle of the engine 14 by continuing to keep the engine 14 operating for a remainder of the drive cycle. If this pump condition is detected when the engine 14 is shut down during a stop-start cycle, the controller 22 starts the engine 14 to discontinue the stop-start cycle. Restarting the engine 14 can prevent damage to the pump 18. This pump condition is generally considered a non-recoverable fault.

In another example, the controller 22 receives a pump condition indicating that a temperature associated with the pump 18 exceeds a threshold temperature. In response to this pump condition, the controller 22 may shut down the motor 26. The controller 22 could, for example, shut down the motor 26 if the pump temperature exceeds another threshold motor shutdown temperature. In response to this pump condition, the controller 22 can delay an upcoming stop-start cycle. This pump condition is, in some examples, a result of a heat source external to the pump 18. The heat source may lose heat causing a drop in the temperature associated with the pump 18 below the threshold temperature. The pump condition is thus potentially a recoverable fault. Notably, since the stop-start cycle is delayed or avoided until the temperature recovers and falls below the threshold temperature, an operator of the vehicle 10 may not perceive this pump condition, which can be desirable.

In another example, the controller 22 receives a pump condition indicating that a speed of the pump 18 is less than a threshold speed (e.g., a speed of 100 rpm after 300 msec of the speed being commanded). This pump condition can indicate that the pump 18 is stalled or otherwise unable to reach a targeted speed. In response to this pump condition, the controller 22 may shut down the motor 26 after a threshold delay, say 2000 milliseconds. In response to this pump condition, the controller 22 can further prevent any upcoming stop-start cycle of the engine 14 by continuing to keep the engine 14 operating for a remainder of the drive cycle. If this pump condition is detected when the engine 14 is shut down during a stop-start cycle, the controller 22 allows the stop-cycle to continue because restarting the engine while the condition is present may result in drive-line clunk. Since this pump condition is not likely to result in damage to the pump, the current stop-start cycle is allowed to continue in hopes that the fault will recover.

This pump condition is generally considered a non-recoverable fault. The controller 22 may permit one stop-start cycle, but then prevent any other stop-start cycles for a remainder of the drive cycle in response to this pump condition. Alternatively, the controller 22 may prevent the engine 14 from autostopping for the entire drive cycle in response to this condition.

In another example, the controller 22 receives a pump condition indicating that the pump 18 has a correct current and speed condition. The pump condition can reflect the pump 18 operating current to be within 10% of a normal operating range and an actual speed being within 10% of a commanded speed.

In another example, the controller 22 receives a pump condition indicating that the pump 18 is running over speed, but with a correct current. This pump condition can mean that a speed of the pump 18 is greater than a threshold percent of a commanded speed (e.g., 110% of a commanded speed). In response to this pump condition, the controller 22 may shut down the motor 26 after a threshold delay, say 15 seconds. If this pump condition is received, the controller 22 does not prevent or discontinue a stop-start cycle of the engine 14. This pump condition typically does not cause durability issues or functional issues perceived by a driver.

In another example, the controller 22 receives a pump condition indicating that the pump 18 is running under speed, but with correct current. The pump condition can mean that a speed of the pump 18 is less than a threshold percent of a commanded speed (e.g., 90% of a commanded speed. The operating current in this pump condition can be within 10% of a normal operating range. In response to this pump condition, the controller 22 can prevent any upcoming stop-start cycle of the engine 14 by continuing to keep the engine 14 operating for a remainder of the drive cycle. The pump condition can undesirably result in driveline clunk or other undesirable characteristics. Thus, avoiding upcoming stop-start cycles for the remainder of the drive cycle may be desirable. If this pump condition is detected when the engine 14 is shut down during a stop-start cycle, the controller 22 does not, in response to this pump condition, restart the engine 14 to discontinue the stop-start cycle. If detected when the engine 14 is shut down during a stop-cycle, restart is going to occur anyway, so permitting the stop-start cycle to continue may provide the pump 18 with time to recover from this pump condition.

In another example, the controller 22 receives a pump condition indicating that the pump 18 has a current and speed outside of a threshold range condition. This pump condition can be in response to a measured speed differing by more than 10% from a commanded speed, and a measured current differing by more than 10% from a current corresponding to the commanded speed. In response to this pump condition, the controller 22 may shut down the motor 26 after a threshold delay. The delay can be calibrated to protect the motor. In response to this pump condition, the controller 22 can avoid upcoming stop-start cycles for the remainder of the drive cycle, and can further restart the engine 14 to discontinue a stop-start cycle if the pump condition is received during a stop-start cycle. This pump condition can indicate that damage to the pump 18 can occur, thus operating the engine 14 so that the pump 18 is not required to operate can be desirable.

In another example, the controller 22 receives a pump condition indicating that the pump 18 has and a speed disabled condition where no command signal is received at the pump 18. The pump condition can indicate that the controller 22 is detecting no command signal sent to the controller 22 (e.g., powertrain control module) to the pump 18. In response to this pump condition, the controller 22 may shut down the motor 26 after a threshold delay, say 2000 milliseconds. This pump condition is generally considered a recoverable fault. Thus, in response to this pump condition, the controller 22 can start the engine 14 or continue to operate the engine 14 to discontinue a stop-start cycle and avoid upcoming stop-start cycles. The controller 22 continues to keep the engine 14 operating through the drive-cycle until the pump condition changes indicating that a command signal is received.

In another example, the controller 22 receives a pump condition indicating that the signal sent from the pump 18 to the controller 22 has a frequency that is outside of a set range. This pump condition is generally considered a recoverable fault. Thus, in response to this pump condition, the controller 22 can start the engine 14 or continue to operate the engine 14 to discontinue a stop-start cycle and avoid upcoming stop-start cycles. The controller 22 continues to keep the engine 14 operating through the drive-cycle until the pump condition changes indicating that a signal sent from the pump 18 to the controller 22 has returned to be within the set range.

In another example, the signal sent from the pump 18 to the controller 22 is a pulse width modulated signal having a duty cycle that is varied to represent particular pump conditions. The controller 22 can receive a pump condition indicating that the signal has a duty cycle that is outside of a set range. This pump condition is generally considered a recoverable fault. Thus, in response to this pump condition, the controller 22 can start the engine 14 or continue to operate the engine 14 to discontinue a stop-start cycle and avoid upcoming stop-start cycles. The controller 22 continues to keep the engine 14 operating through the drive-cycle until the pump condition changes indicating that a signal sent from the pump 18 to the controller 22 has a duty cycle falling within the set range such that the controller 22 can receive other pump conditions.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A pump condition response method, comprising:
in response to a pump condition, operating an engine to discontinue or prevent a first stop-start cycle during a drive cycle, and then permitting a second stop-start cycle during the drive cycle.

2. The method of claim 1, wherein the pump condition is a recoverable fault.

3. The method of claim 1, wherein the pump condition is a first pump condition, and further comprising, in response to a second pump condition, operating the engine for a remainder of the drive cycle to prevent any stop-start cycle during the drive cycle.

4. The method of claim 3, wherein the second pump condition is non-recoverable fault.

5. The method of claim 1, wherein the first stop-start cycle and the second stop-start cycle are within the same drive cycle.

6. The method of claim 1, wherein the operating comprises idling.

7. The method of claim 1, wherein the pump condition is a recoverable fault and is received when the pump is commanded on and the engine is commanded off, and the method further comprises starting the engine and then receiving an additional pump condition later in the drive cycle, the method permitting the second stop-start cycle if the additional pump condition indicates that the pump has recovered from the recoverable fault.

8. The method of claim 1, wherein the pump condition is first pump condition, and further comprising, in response to a second pump condition, preventing any stop-start cycle during a remainder of the drive cycle.

9. An electrified vehicle assembly, comprising:
a pump;
an engine; and
a vehicle controller configured to discontinue or prevent a first stop-start cycle by commanding the engine on in response to a pump condition received during a drive cycle, the vehicle controller further configured to permit a second stop-start cycle of the engine later in the drive cycle.

10. The assembly of claim 9, wherein the pump condition is a recoverable fault.

11. The assembly of claim 9, wherein the pump condition is a first pump condition, and the vehicle controller is further configured to command the engine to operate for a remainder of the drive cycle in response to a second pump condition.

12. The assembly of claim 11, wherein the second pump condition is a non-recoverable fault.

13. The assembly of claim 9, wherein the first stop-start cycle and the second stop-start cycle are within the same drive cycle.

14. The assembly of claim 9, wherein the pump condition is the recoverable fault and is received when the pump is commanded on and the engine is commanded off, and the controller is further configured to command the engine on and to permit the second stop-start cycle if an additional pump condition received later in the drive cycle indicates that the pump has recovered from the recoverable fault.

15. The assembly of claim 9, wherein the pump condition is first pump condition, and further comprising, in response to a second pump condition, preventing any stop-start cycle during a remainder of the drive cycle.

16. The assembly of claim 9, wherein the vehicle controller comprises a powertrain control module.

17. The assembly of claim 9, wherein the engine, the pump, and the vehicle controller are portions of a stop-start vehicle.

18. The assembly of claim 9, wherein the engine, the pump, and the vehicle controller are portions of an electrified vehicle.

19. The method of claim 1, further comprising communicating fluid through the engine using a pump, the pump condition a condition of the pump that communicates fluid through the engine.

20. The assembly of claim 9, wherein the pump operates to influence a pressure of a fluid within the engine.

* * * * *

UNITED STATES PATENT AND TRADEMARK OFFICE
CERTIFICATE OF CORRECTION

PATENT NO. : 9,821,799 B2
APPLICATION NO. : 15/046756
DATED : November 21, 2017
INVENTOR(S) : Hafiz Shafeek Khafagy et al.

It is certified that error appears in the above-identified patent and that said Letters Patent is hereby corrected as shown below:

In the Claims

In Claim 7, Column 9, Line 22; after "is received when" replace "the pump" with --a pump--

In Claim 14, Column 10, Line 15; before "and is received" replace "the recoverable fault" with --a recoverable fault--

In Claim 15, Column 10, Line 22; before "first pump condition" replace "is" with --is a--

Signed and Sealed this
Twenty-second Day of May, 2018

Andrei Iancu
*Director of the United States Patent and Trademark Office*